Figure 1:
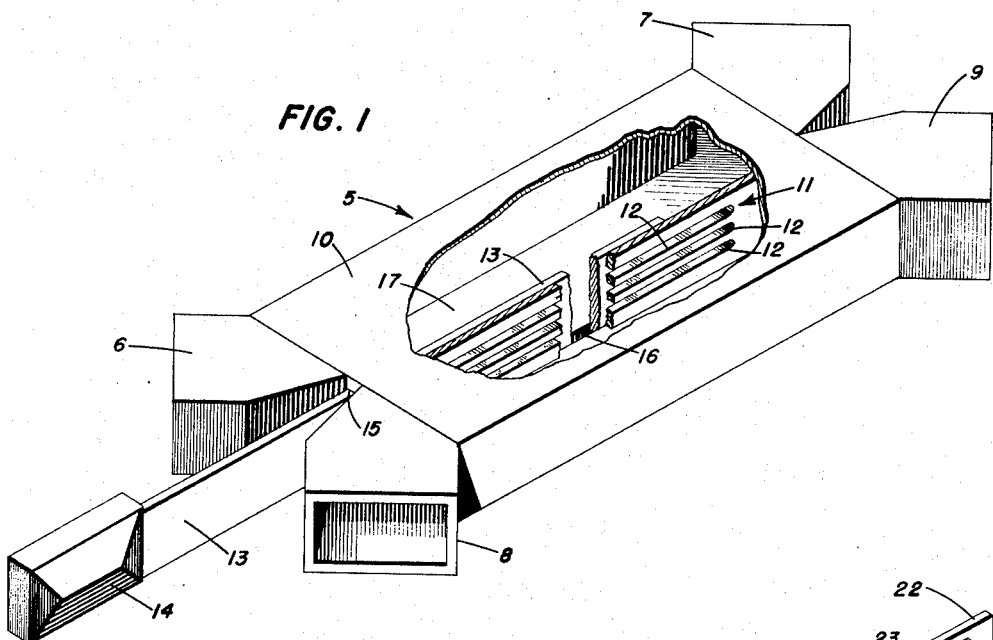

Nov. 12, 1957

R. D. HATCHER 2,813,254

BROAD BAND MATCHING HYBRID WAVEGUIDE

Filed May 23, 1952

INVENTOR
ROBERT D. HATCHER

BY *G. D. O'Brien*

ATTORNEY

United States Patent Office 2,813,254
Patented Nov. 12, 1957

2,813,254
BROAD BAND MATCHING HYBRID WAVEGUIDE

Robert D. Hatcher, Washington, D. C., assignor to the United States of America as represented by the Secretary of the Navy Application May 23, 1952, Serial No. 289,703

1 Claim. (Cl. 333—7)

(Granted under Title 35, U. S. Code (1952), sec. 266)

The invention described herein may be manufactured and used by or for the Government of the United States of America for governmental purposes without the payment of any royalties thereon or therefor.

This invention relates to a waveguide coupling and more particularly to an adjustable impedance matching device for efficiently coupling waveguides over any one of a broad band of frequencies.

One principal manner of coupling energy into or out of a waveguide is to provide a slot or hole in the waveguide wall enabling energy to be passed therethrough. However as any abrupt change in the shape or size of the waveguide causes undesired reflections of energy, this slot or opening in order to transmit energy efficiently preferably has a given configuration and size to properly couple, or impedance match, the waveguide to the second medium and thereby eliminate these undesired reflections. If energy is to be coupled from one waveguide to another through such a slot or opening, the configuration and dimensions of this slot are initially selected to match the characteristic impedance of the first waveguide to the second and thereafter energy may be efficiently transmitted from one waveguide to the other through this slot as long as the characteristic impedances of the waveguides remain constant. However, the characteristic impedance of a waveguide varies dependent upon the dimensions of the guide, the mode of transmission of the electromagnetic waves, and the frequency of the wave, and therefore a coupling having a fixed slot or opening may not efficiently transfer energy between two fixed dimension waveguides should the wave frequency, or mode of wave transmission vary.

The present invention recognizing the need for a variable coupling to efficiently match two waveguides for energy transmission therebetween over any one of a broad band of frequencies, provides a novel waveguide coupling connectable to two waveguides and provided with a series of adjustable slot openings therebetween. The adjustable slot openings enabling energy transfer between the guides in the most efficient manner, by permitting the dimensions of the slots to be adjusted for each wave frequency transmitted, thereby enabling proper impedance matching of the waveguides over any one of a broad band of frequencies.

It is accordingly one object of this invention to provide an energy transfer coupling device for two waveguides.

A further object of this invention is to provide an adjustable impedance matching device for efficiently coupling two waveguides.

A further object of this invention is to provide an adjustable impedance matching device for efficiently coupling two waveguides for intertransmission of any one of a broad band of frequencies.

Figure 2:
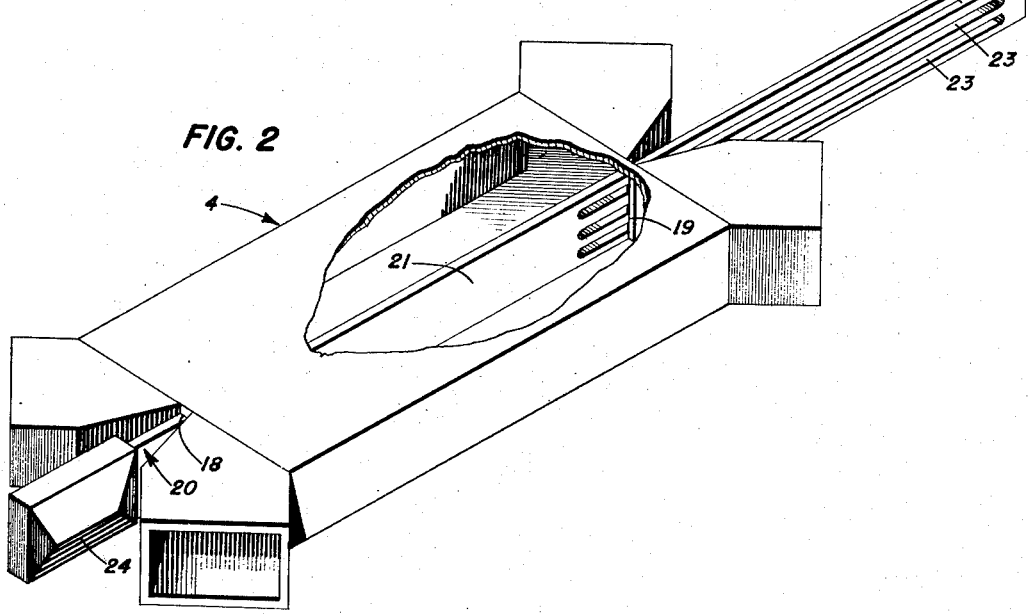

Other objects and many of the attendant advantages of this invention will be readily appreciated as the same becomes better understood by reference to the following detailed description when considered in connection with the accompanying drawings wherein:

Fig. 1 is an isometric view, with a portion of the top wall broken away, of one preferred embodiment of the invention; and Fig. 2 is a similar isometric view of a second preferred embodiment of the invention.

Referring now to Fig. 1 for a detailed consideration of one preferred embodiment of the present invention, the waveguide coupling generally designated 5 comprises a box shaped enclosure preferably formed of two short contiguous waveguide channels joined side by side and having all four terminals 6, 7, 8, and 9 accessible. Observing the inside construction of waveguide coupling 5 through the cutaway portion of top plate 10, the adjacent joined walls of both guides are removed and a single mutual wall or partition 11 is positioned intermediate the two channels. A plurality of slots 12 preferably horizontally arranged to minimize reflections, are cut through the dividing partition 11 to enable energy to be coupled from one waveguide channel to another. For adjustment of the effective slot length, between channels a movable slide 13, preferably of conducting, resilient material so as to assure good electrical contact with the adjacent structure, is positioned to move alongside the slotted partition 11. Movement of slide 13 into or out of the box shaped enclosure 5, therefore covers or uncovers the slots to thereby vary the openings or radiating windows between the two guides. Slide 13, having a handle 14, is inserted or withdrawn through a nonradiating vertical slot 15 at one end of the box 5, as shown, and it is guided by suitable means such as grooves 16 or other slidable connection in upper and lower plates 10 and 17 of the waveguide box to make good electrical connection thereto.

Although slide 13 and slotted partition 11 are represented in the drawing as having a substantial thickness for the purpose of illustration, in actual practice these members are preferably constructed of extremely thin material to prevent wave reflection effects.

Fig. 2 illustrates a second preferred embodiment of the invention, comprising a waveguide coupling essentially similar in construction and operation to that of Fig. 1 with the exception of the means for adjusting the slot openings. In this embodiment a waveguide coupling in the general shape of a box 4 has two vertical nonradiating slots 18 and 19, one at each end through which a movable partitioning slide 20, approximately twice as long as slide 13 of Fig. 1, passes. In this coupling, the fixed partition is removed and the sole means for separating the two waveguide channels within the coupling comprises the movable slide 20. Movable slide 20 is preferably divided into two portions 21 and 22, each as long as or slightly longer than the length of the coupling. Portion 21, as shown, is solid, while portion 22 has a number of spaced horizontally arranged slots 23, cut therethrough in a similar manner to that of fixed partition 11 of Fig. 1.

In operation, positioning slide handle 24 toward the box places the solid portion 21 of slide 20 intermediate the two waveguide channels thereby preventing passage of energy therebetween, while conversely as handle 24 is withdrawn slotted portion 22 of slide 20 is positioned intermediate the two waveguide channels enabling radiation of energy through the openings. Adjustment of slide 20, therefore, enables the size of the slotted openings between the waveguide channels to be varied and thereby enables the impedance matching of the waveguides over any one of a broad band of frequencies.

The two embodiments discussed above comprise merely illustrative forms of the invention and in actual practice depending upon the frequency, mode of transmission, and size of the two waveguide channels the configuration, length, and width of the slot openings may be varied. Further it is contemplated that vernier adjustment of the slide by any suitable means in either embodiment will enable accurae impedance matching of the waveguides.

It is further apparent that the slide in either embodiment may be moved by a remote control means of any suitable type (not illustrated) so that automatic control of the degree of intercommunication between the waveguides may be effected.

Obviously many modifications and variations of the present invention are possible in the light of the above teachings. It is therefore to be understood that within the scope of the appended claim the invention may be practiced otherwise than as specifically described.

What is claimed is:

A broad band matching hybrid waveguide comprising a casing having top and bottom walls and a pair of side walls connected thereto, a pair of mutually spaced converging hollow waveguide terminals carried by said top, bottom and side walls at each end of said casing, each pair of terminals having an elongated vertical medial opening formed therebetween at the apex of the angle of convergence thereof, an elongated impedance matching slide for longitudinally dividing and forming a pair of waveguide channels within said casing in side by side relationship with respect to each other and movable through the vertical opening in each of said terminals, each of said waveguide channels being in communication with a pair of said hollow terminals, said slide having a solid portion at one end and a plurality of vertically spaced horizontally disposed elongated slots in the other end thereof the length of which is greater than the width of said casing, said solid portion and elongated slots being of a length greater than the length of the casing, a longitudinal groove formed in the inner surface of the top wall and a complementary longitudinal groove formed in the inner surface of the bottom wall for snugly receiving, guiding, and maintaining the slide in positive electrical contact with the top and bottom walls, and means carried by said slide at the solid portion thereof for moving the slide through said vertical openings and the grooves to position the slide such that a desired amount of the elongated slots are disposed within said casing between said channels thereby to control the amount of energy directionally transferred between the waveguide channels.

References Cited in the file of this patent

UNITED STATES PATENTS

| | | |
|---|---|---|
| 2,423,130 | Tyrrell | July 1, 1947 |
| 2,427,106 | Landon | Sept. 9, 1947 |
| 2,512,191 | Wolf | June 20, 1950 |
| 2,568,090 | Riblet | Sept. 18, 1951 |
| 2,579,327 | Lund | Dec. 18, 1951 |
| 2,591,980 | Van Hofweegen | Apr. 8, 1952 |
| 2,660,706 | Hill | Nov. 24, 1953 |
| 2,684,469 | Sensiper | July 20, 1954 |
| 2,701,340 | Miller | Feb. 1, 1955 |
| 2,701,342 | Fox | Feb. 1, 1955 |
| 2,702,884 | Riblet | Feb. 22, 1955 |
| 2,735,069 | Riblet | Feb. 14, 1956 |